(12) United States Patent  (10) Patent No.: US 8,880,741 B2
Sip  (45) Date of Patent: Nov. 4, 2014

(54) ELECTRONIC SYSTEMS AND MANAGEMENT METHODS

(71) Applicant: Acer Incorporated, Taipei Hsien (TW)

(72) Inventor: Kim Yeung Sip, Taipei Hsien (TW)

(73) Assignee: Acer Incorporated, Hsichih, Taipei Hsien (TW)

( * ) Notice: Subject to any disclaimer, the term of this patent is extended or adjusted under 35 U.S.C. 154(b) by 75 days.

(21) Appl. No.: 13/650,412

(22) Filed: Oct. 12, 2012

(65) Prior Publication Data

US 2013/0097338 A1    Apr. 18, 2013

(30) Foreign Application Priority Data

Oct. 17, 2011   (TW) .............................. 100137468 A

(51) Int. Cl.
*G06F 3/00*     (2006.01)
*G06F 5/00*     (2006.01)
*G06F 13/42*    (2006.01)

(52) U.S. Cl.
CPC ................................. *G06F 13/4247* (2013.01)
USPC .................................... 710/3; 710/36; 710/38

(58) Field of Classification Search
None
See application file for complete search history.

(56) References Cited

U.S. PATENT DOCUMENTS

2002/0112070 A1* 8/2002 Ellerbrock et al. ........... 709/238
2010/0257303 A1* 10/2010 Lee et al. ...................... 710/316
2012/0130512 A1* 5/2012 Song ............................... 700/86
2013/0059578 A1* 3/2013 Finberg ......................... 455/425

FOREIGN PATENT DOCUMENTS

WO    WO 2007/134444    11/2007
WO    WO 2009/078507    6/2009

OTHER PUBLICATIONS

European Search Report dated Apr. 3, 2013.

* cited by examiner

*Primary Examiner* — Idriss N Alrobaye
*Assistant Examiner* — Ronald Modo
(74) *Attorney, Agent, or Firm* — McClure, Qualey & Rodack, LLP

(57) ABSTRACT

A management method is provided, suitable for an electronic system having electronic devices connected in a daisy-chain configuration. The management method comprises the steps of: the electronic devices are sequentially connected with a host, thereby obtaining universal unique identifiers corresponding to the electronic devices; serial numbers corresponding to the electronic devices are generated according to a first order of obtainment of the universal unique identifiers of the electronic devices; and the host communicates with the electronic devices according to the serial numbers.

10 Claims, 3 Drawing Sheets

ELECTRONIC SYSTEMS AND MANAGEMENT METHODS

CROSS REFERENCE TO RELATED APPLICATIONS

This Application claims priority of Taiwan Patent Application No. 100137468, filed on Oct. 17, 2011, the entirety of which is incorporated by reference herein.

BACKGROUND OF THE INVENTION

1. Field of the Invention

The present invention relates to electronic systems, and in particular relates to electronic systems having THUNDERBOLT™ interfaces.

2. Description of the Related Art

Recently, computers and networks have made many innovative functions more effective. New peripheral devices, such as internet units and external storage units, can easily be connected to computers or notebooks. However, there are various peripheral devices connected to the host (e.g., computer) and the user can not determine which peripheral device is currently being used. Thus, there is a need for an electronic system and a management method thereof to increase the convenience of usage.

BRIEF SUMMARY OF THE INVENTION

In light of the previously described problems, the invention provides an embodiment of a management method suitable for an electronic system having electronic devices connected in a daisy-chain configuration. The management method comprises the steps of: the electronic devices are sequentially connected with a host, thereby obtaining universal unique identifiers corresponding to the electronic devices; serial numbers corresponding to the electronic devices are generated according to a first order of obtainment of the universal unique identifiers of the electronic devices; and the host communicates with the electronic devices according to the serial numbers.

The invention also provides an electronic system. An electronic system comprises a plurality of electronic devices and a control module. The electronic devices are connected in a daisy-chain configuration. The control module sequentially connects the electronic devices with a host to obtain universal unique identifiers corresponding to the electronic devices and generates serial numbers corresponding to the electronic devices according to a first order of obtainment of the universal unique identifiers of the electronic devices, thereby communicating with the electronic devices according to the serial numbers.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
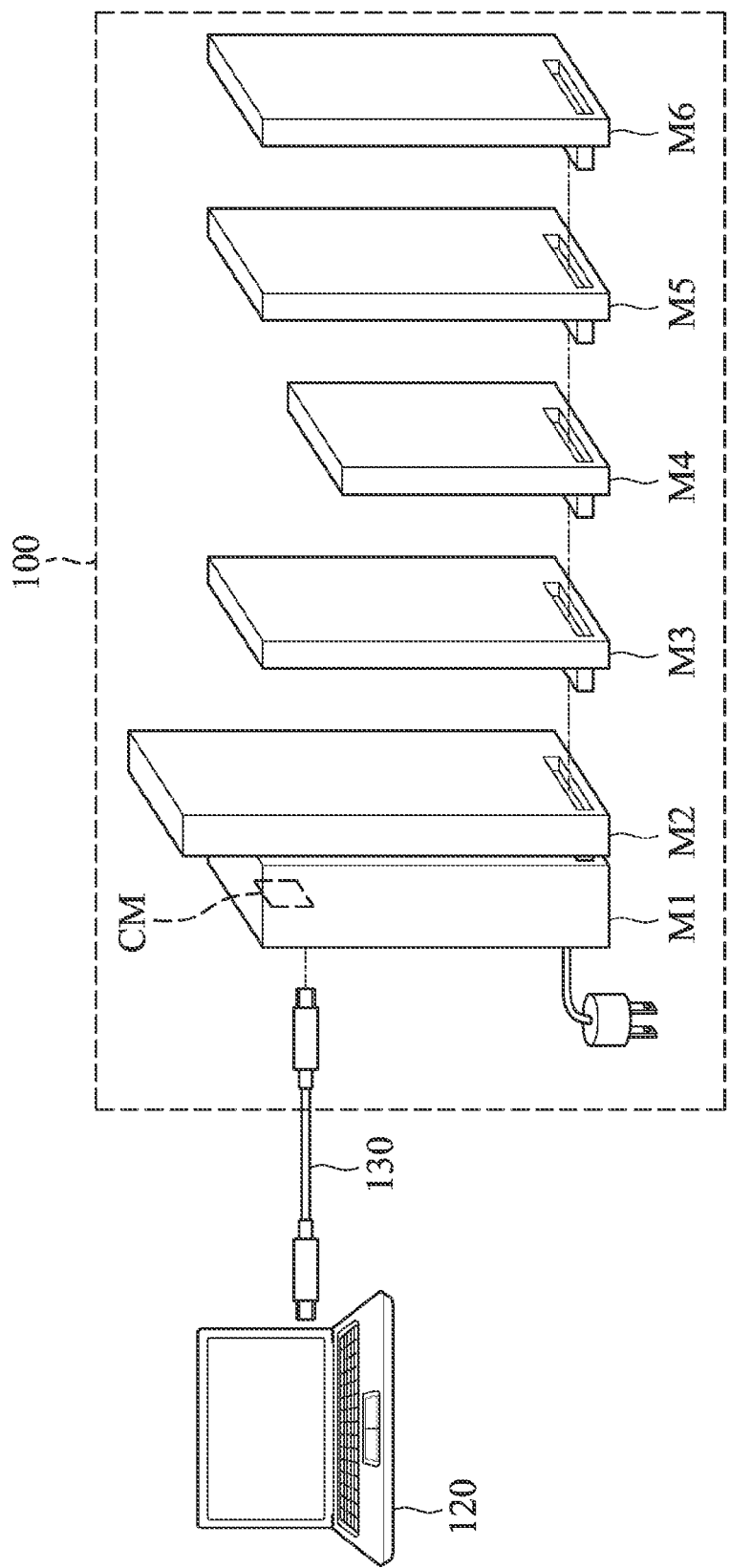
FIG. 1 illustrates an embodiment of the electronic system for performing a performance control process.

FIG. 1 illustrates an embodiment of the electronic system. As shown in FIG. 1, an electronic system 100 has electronic devices M1~M6 and a control module CM. In the embodiment, the control module CM can be disposed in one of the electronic devices M1~M6 or in a host 120 coupled to the electronic system 100 through a transmission cable 130, but is not limited thereto. The electronic devices M1~M6 are overlapped in a direction.

In addition, each of the electronic devices M1~M6 has a high speed transmission interface, e.g., a thunderbolt interface, such that the electronic devices M1~M6 use a transport protocol compatible with a thunderbolt interface to communicate with a host 120. The electronic devices M1~M6 are coupled in a daisy-chain configuration.

In detail, each of the electronic devices M1~M6 can be any of various kinds of peripheral devices. For example, the electronic device M1 can be a TV box. The electronic device M2 can be an optical disk drive. The electronic device M3 can be a hard disk drive (HDD). The electronic device M4 can be a graphics processing unit (GPU) device. The electronic device M5 can be a speaker. Note that the number and the type of the electronic devices are provided for illustration, but are not limited thereto, any electronic device having the thunderbolt interface, any electronic device having interfaces faster than the thunderbolt interface or any electronic device coupled in the daisy-chain configuration can serve as the electronic device of the invention.

Figure 2:
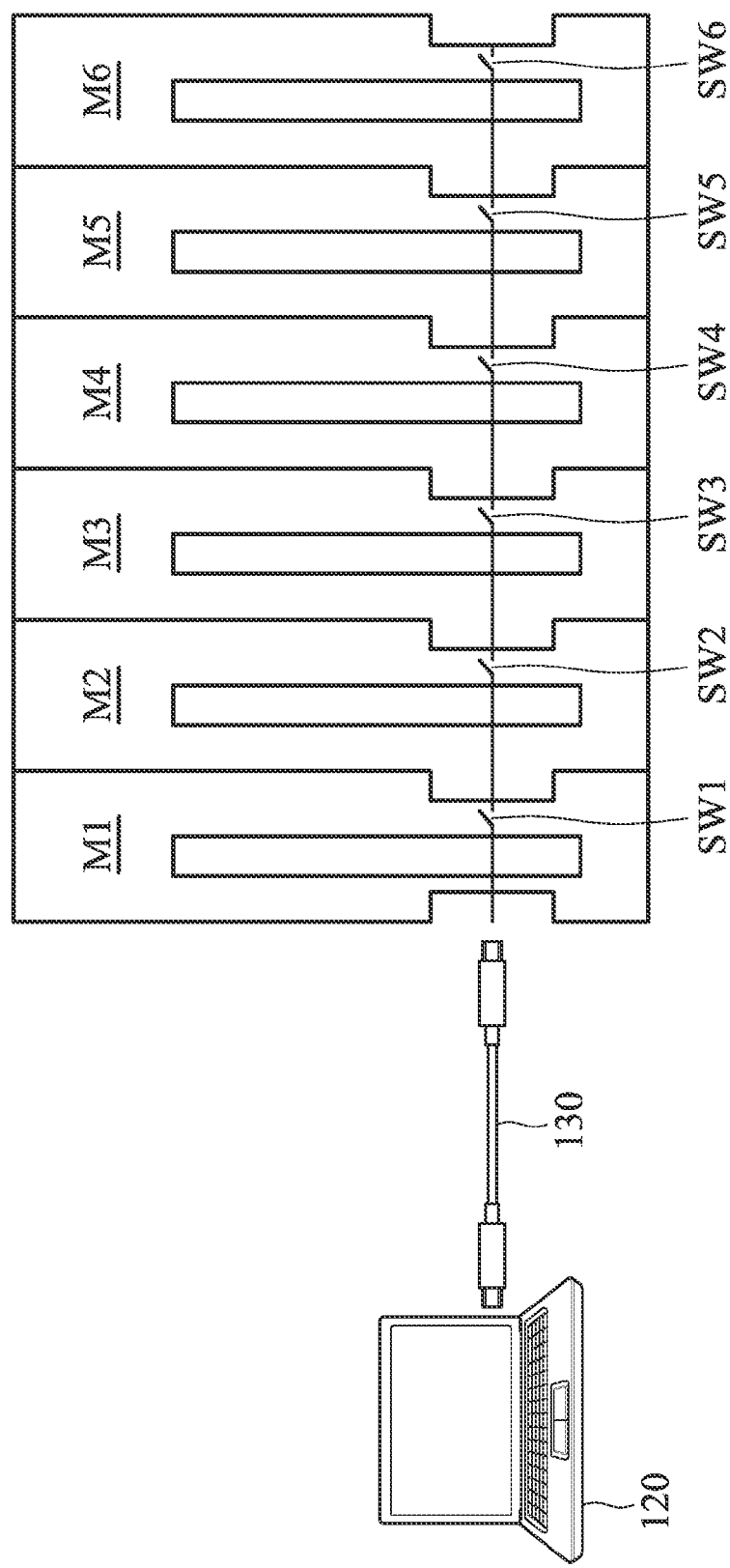
FIG. 2 illustrates a schematic view of the electronic system.

FIG. 2 illustrates a schematic view of the electronic system. As shown in FIG. 2, the electronic devices M1~M6 have switching units SW1~SW6, respectively. The control module CM enables one of the electronic devices M1~M6 to connect with a host in turn, thereby obtaining universal unique identifiers (UUID) corresponding to the electronic devices M1~M6, and the control module CM generates serial numbers (e.g., NO1~NO6) corresponding to the electronic devices M1~M6 according to an order of obtainment of the universal unique identifiers of the electronic devices. Therefore, the users can give an instruction to the control module CM according to the serial numbers shown in the monitor, such that the host 120 communicates with the electronic devices MF~M6 according to the serial numbers.

For example, the electronic device M1 is electrically and directly connected to the host 120 through the transmission cable 130. The control module CM obtains a universal unique identifier UUID1 of the electronic device M1 of the electronic system 100, and generates a serial number NO1 corresponding to the electronic device M1 before the switching unit SW1 of the electronic device M1 is turned on, such that the switching unit SW1 operates in a closed circuit state to determine whether another electronic device (e.g., electronic device M2) is electrically connected to the electronic device M1. When the control module CM detects that there is no electronic device except for the electronic device M1, the control module CM determines that the electronic device M1 is the last electronic device.

When the electronic device M2 is connected to the electronic device M1, the control module CM turns off the switching units SW1 and SW2, such that the switching units SW1 and SW2 operate in the open circuit state (the switching unit SW1 changes from the close circuit state to the open circuit state). Therefore, the control module CM only obtains the universal unique identifier UUID1 of the electronic device M1 of the electronic system 100, and generates a serial number NO1 corresponding to the electronic device M1 before the switching unit SW1 of the electronic device M1 is turned on, such that the switching unit SW1 operates in a closed circuit state in order to determine whether another electronic device (e.g., electronic device M2) is electrically connected to the electronic device M1. The control module CM can obtain a universal unique identifier UUID2 of the electronic device M2 of the electronic system 100 due to the connection between the electronic devices M2 and M1, and generates a serial number NO2 corresponding to the electronic device M2 before the switching unit SW2 of the electronic device M2 is turned on, such that it is determined whether another electronic device (e.g., electronic device M3) is electrically connected to the electronic device M2, wherein the electronic device M1 is electrically connected between the electronic device M2 and the host 120. When the control module CM detects that there is no electronic device except for the electronic devices M1 and M2, the control module CM determines that the electronic device M2 is the last electronic device.

When the electronic device M3 is connected to the electronic device M2, the control module CM turns off the switching units SW1, SW2 and SW3, such that the switching units SW1, SW2 and SW3 operate in the open circuit state (the switching units SW1 and SW2 change from the close circuit state to the open circuit state). Therefore, the control module CM only obtains the universal unique identifier UUID1 of the electronic device M1 of the electronic system 100, and generates a serial number NO1 corresponding to the electronic device M1 before the switching unit SW1 of the electronic device M1 is turned on, such that the switching unit SW1 operates in the close circuit state in order to determine whether another electronic device (e.g., electronic device M2) is electrically connected to the electronic device M1. The control module CM can obtain a universal unique identifier UUID2 of the electronic device M2 of the electronic system 100 due to the connection between the electronic devices M2 and M1, and generates a serial number NO2 corresponding to the electronic device M2 before the switching unit SW2 of the electronic device M2 is turned on, such that it is determined whether another electronic device (e.g., electronic device M3) is electrically connected to the electronic device M2. The control module CM can obtain a universal unique identifier UUID3 of the electronic device M3 of the electronic system 100 due to the connection between the electronic devices M3 and M2, and generates a serial number NO3 corresponding to the electronic device M3 before the switching unit SW3 of the electronic device M3 is turned on, such that it is determined whether another electronic device (e.g., electronic device M4) is electrically connected to the electronic device M3, wherein the electronic device M2 is electrically connected between the electronic devices M1 and M3. When the control module CM detects that there is no electronic device (e.g., electronic device M4) except for the electronic devices M1, M2 and M3, the control module CM determines that the electronic device M3 is the electronic device.

Details of the procedure of the other electronic devices (e.g., electronic devices M4~M6) are similar to the procedure of the electronic devices M1~M3, therefore, the details of the other electronic devices are omitted for brevity. The control module CM can display the information and the serial numbers NO1~NO6 of the electronic devices M1~M6 on the monitor, such that the user can select the desired electronic devices according to the serial numbers NO1~NO6 and take away the desired electronic devices according to the order of the electronic devices M1~M6. For example, assume that the electronic devices are hard disks and the user stores data in the electronic device M3 (the electronic device M3 is selected as the desired electronic device) having the serial number NO3. When the user wants to head out or take away the electronic device which the data is stored in, the user only needs to take away the third electronic device (i.e., electronic device M3) of the electronic devices M1~M6 rather than check all electronic devices one by one to find out which electronic device the data is stored in.

In the embodiment, the arrangement order of the electronic devices M1~M6 can serve as a password. In detail, a password (e.g., A11B22C33D44E55F66) is generated according to the order of the electronic devices M1~M6 (M1, M2, M3, M4, M5, M6). When the electronic system is to be unlocked, the universal unique identifiers of the electronic devices are obtained and it is determined whether the order of obtainment of the universal unique identifiers of the electronic devices and the universal unique identifiers of the electronic devices are the same as the password, in order to unlock the electronic system. For example, the first user sets the order (M1, M2, M6, M5, M4, M3) of the electronic devices as a password (e.g., A11B22C33F66E55D44) before going away. The second user changes the order of the electronic devices to another order (e.g., M1, M2, M3, M4, M5, M6) or takes one of the electronic devices away. Thus, the order of the electronic devices and the universal unique identifiers of the electronic devices are different from the password. Therefore, the second user can not open (or use) the electronic system unless the order of the electronic devices M1~M6 and the universal unique identifiers of the electronic devices M1~M6 are the same as the password.

Figure 3:
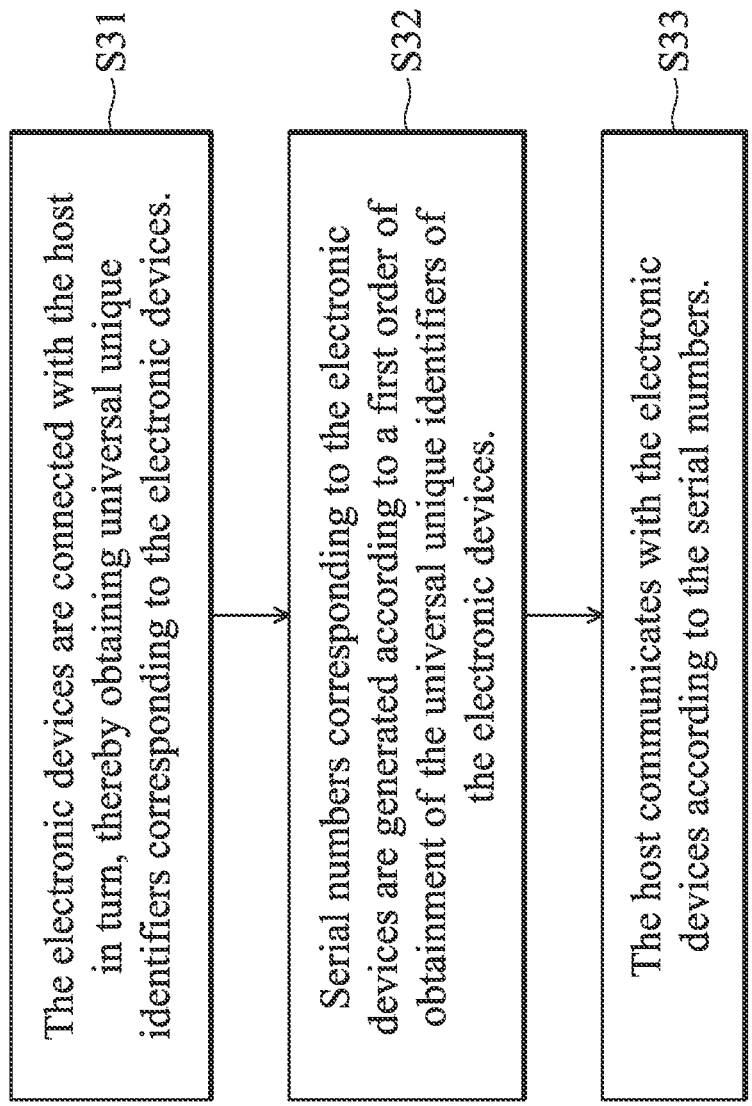
FIG. 3 illustrates a flowchart of the management method of the invention.

FIG. 3 illustrates a flowchart of the management method of the invention suitable for the electronic system 100 having the electronic devices (e.g., electronic devices M1~M6) connected in a daisy-chain configuration. As shown in FIG. 3, the management method includes the following steps.

In step S31, the electronic devices M1~M6 are connected with the host 120 in turn, thereby obtaining universal unique identifiers UUID1~UUID6 corresponding to the electronic devices M1~M6. In step S32, serial numbers corresponding to the electronic devices M1~M6 are generated according to a first order of obtainment of the universal unique identifiers UUID1~UUID6 of the electronic devices M1~M6. In step S33, the host 120 communicates with the electronic devices M1~M6 according to the serial numbers Because the electronic devices M1~M6 of the invention are coupled in the daisy chain configuration rather than in a tree-like configuration, the users can know which electronic devices are in use according to the serial numbers. Furthermore, the users can set a password according to the order and the universal unique identifiers of the electronic devices, thereby preventing the electronic devices from being misplaced.

The foregoing has outlined features of several embodiments so that those skilled in the art may better understand the detailed description. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A management method, suitable for an electronic system having electronic devices connected in a daisy-chain configuration, comprising:
    connecting, sequentially, the electronic devices with a host, thereby obtaining universal unique identifiers corresponding to the electronic devices;
    generating serial numbers corresponding to the electronic devices according to a first order of obtainment of the universal unique identifiers of the electronic devices;
    communicating with the electronic devices according to the serial numbers,
    generating a password according to the first order and the serial numbers;
    obtaining the universal unique identifiers of the electronic devices when a lock of the electronic system is to be unlocked; and
    determining whether a second order of obtainment of the universal unique identifiers of the electronic devices and the universal unique identifiers of the electronic devices are the same as the password, thereby unlocking the lock of the electronic system.

2. The management method as claimed in claim 1, comprising:
    obtaining a universal unique identifier of a first electronic device of the electronic system, wherein the first electronic device is electrically connected to the host through a transmission cable;
    generating a first serial number corresponding to the first electronic device; and
    turning on a first switching unit of the first electronic device to detect whether a second electronic device is electrically connected to the host.

3. The management method as claimed in claim 2, further comprising:
    obtaining a universal unique identifier of the second electronic device of the electronic system;
    generating a second serial number corresponding to the second electronic device; and
    turning on a second switching unit of the second electronic device to detect whether a third electronic device is electrically connected to the second electronic device, wherein the first electronic device is electrically connected between the host and the second electronic device.

4. The management method as claimed in claim 1, wherein the electronic devices are overlapped in a direction and a transport protocol compatible with a THUNDERBOLT™ interface is used to communicate with the host.

5. The management method as claimed in claim 1, wherein the electronic devices have a graphics processing unit, a central processing unit, storage unit, a TV box and/or an optical disk drive.

6. An electronic system, comprising:
    a plurality of electronic devices, connected in a daisy-chain configuration;
    a control module, connecting, sequentially, the electronic devices with a host to obtain universal unique identifiers corresponding to the electronic devices and generating serial numbers corresponding to the electronic devices according to a first order of obtainment of the universal unique identifiers of the electronic devices, thereby communicating with the electronic devices according to the serial numbers,
    wherein the control module generates a password according to the first order and the serial numbers, and when the electronic system is to be unlocked, the control module obtains the universal unique identifiers of the electronic devices and determines whether a second order of obtainment of the universal unique identifiers of the electronic devices and the universal unique identifiers of the electronic devices are the same as the password, thereby unlocking the lock of the electronic system.

7. The electronic system as claimed in claim 6, wherein the control module obtains a universal unique identifier of a first electronic device of the electronic system, and generates a first serial number corresponding to the first electronic device before a first switching unit of the first electronic device is turned on, in order to detect whether a second electronic device is electrically connected to the host.

8. The electronic system as claimed in claim 6, wherein the control module obtains a universal unique identifier of a second electronic device of the electronic system, and generates a second serial number corresponding to the second electronic device before a second switching unit of the second electronic device is turned on, in order to detect whether a third electronic device is electrically connected to the second electronic device, wherein a first electronic device is electrically connected between the host and the second electronic device.

9. The electronic system as claimed in claim 6, wherein the electronic devices are overlapped in a direction and a transport protocol compatible with a THUNDERBOLT™ interface is used to communicate with the host.

10. The electronic system as claimed in claim 6, wherein the electronic devices have a graphics processing unit, a central processing unit, storage unit, a TV box and/or an optical disk drive.

* * * * *